(12) United States Patent
Sozzi et al.

(10) Patent No.: US 7,351,438 B2
(45) Date of Patent: Apr. 1, 2008

(54) METHOD OF PREPARING CHEWING GUM POWDER

(75) Inventors: Giuseppe Sozzi, Lainate (IT); Fabio Allasia, San Giuliano Milanese (IT)

(73) Assignee: Gum Base Co. S.p.A., Milan (IT)

( * ) Notice: Subject to any disclaimer, the term of this patent is extended or adjusted under 35 U.S.C. 154(b) by 0 days.

(21) Appl. No.: 10/437,769

(22) Filed: May 13, 2003

(65) Prior Publication Data

US 2004/0058033 A1 Mar. 25, 2004

(51) Int. Cl.
*A23G 4/08* (2006.01)
*A23G 4/20* (2006.01)
*A61K 9/68* (2006.01)

(52) U.S. Cl. .......................... 426/3; 424/439; 424/440; 424/441

(58) Field of Classification Search ................ 426/3–6; 424/439–441
See application file for complete search history.

(56) References Cited

U.S. PATENT DOCUMENTS 6,599,542 B1 * 7/2003 Abdel-Malik et al. ......... 426/4

* cited by examiner

*Primary Examiner*—Arthur L. Corbin
(74) *Attorney, Agent, or Firm*—Kenyon & Kenyon LLP

(57) ABSTRACT

The invention is a chewing gum formulation in powder form, a process for producing it, and a chewing gum in tablet produced by direct compression of a the chewing gum formulation in powder form that is characterized by a chewability that remains unchanged throughout the chewing period.

51 Claims, No Drawings

METHOD OF PREPARING CHEWING GUM POWDER

The subject of the present invention is a novel chewing gum in tablet form, which can be produced by direct compression of a gum formulation in powder form; the chewing gum thus obtained is characterized by a pleasant chewability which remains unchanged throughout the chewing period without hardening like most conventional chewing gums.

BACKGROUND OF THE INVENTION

Examples of chewing gums in compressed form produced by direct compression of mixtures in powder form have been known in the art for several years and various types are available commercially. However, the compressed-powder gums which are currently available are unpleasant to chew because to avoid technical difficulties in the production process they have been produced from hard basic gums. It is in fact known that it is much easier to grind and compress hard and dry materials and that the compression of powders is more complex the softer they are; up to now, the need to have starting mixtures or materials which are sufficiently hard or dry to be granulated and compressed easily has led to the production of chewing gums which are hard and friable, with the risk of some of the gum accidentally being swallowed.

Various chewing gums produced by the compression of powdered ingredients are described in the literature. As early as 1942, U.S. Pat. No. 2,290,120 described, for example, the preparation of chewing gums by cold grinding of basic gum and glucose syrup (at about −20° C.) and subsequent mixing and compression thereof; however, the basic gums used in this patent contain natural gums which, owing to their known limitations with regard to performance, quality of supply, and technical problems of use, have now been almost completely abandoned and replaced by other, synthetic ingredients.

U.S. Pat. No. 4,753,805 describes the granulation and subsequent compression of a chewing-gum composition having a moisture percentage of between 2 and 8%, with the use of various technological coadjuvants such as anti-agglutination agents and granulation coadjuvants (alkali-metal phosphates, alkaline-earth metal phosphates, maltodextrins, or mixtures thereof).

European patent EP-0221850 describes chewing-gum formulations which are suitable for being formed into tablets and which are produced by mixing the basic gum with dry ingredients, including the aromatic portion, without the plasticization due to the oils of the flavourings, subsequent cooling of the mixture to above the freezing point of water (5-10° C.), dry granulation, and compression.

U.S. Pat. No. 4,000,321 describes a chewing gum with characteristics of softness during chewing and light weight. This result is achieved by cold granulation of a chewing-gum mixture, following by spontaneous adhesion by heating of the granulate. A chewing gum which contains bubbles and which cannot be mixed with other ingredients is thus obtained.

WO 99/2503 describes a process which provides for the preparation of a chewing-gum mass in powder form in which the basic gum is cooled to a temperature of between 0 and −35° C.; the mass thus cooled is then granulated, supplemented with the necessary additives and active ingredients, and then compressed.

U.S. Pat. No. 4,588,592 describes a method of preparing chewing gums containing from 70 to 95% by weight of granulated sugar. The granulated sugar, previously heated to a temperature of between 51 and 93° C., is mixed with the basic gum at a temperature of between 54 and 121° C. The product thus obtained can then be used as it is or transformed into a granular product, after cooling to a temperature of between −6 and −40° C.

U.S. Pat. No. 4,161,544 describes a method of preparing chewing gum which provides for sugars to be mixed with a basic gum, heated to a temperature of 60-120° C.; the temperature is then reduced to between 30 and −5° C. and the mass thus obtained is granulated. The method in question provides for the use of "bulking agents" such as gum arabic, pectin, or other similar additives; as is well known, these ingredients are soluble in water and, as such, will be ingested after brief chewing, together with the sugars, thus leaving a bolus of harder consistency; the object proposed is thus achieved only partially, providing chewing which is extremely variable over time.

Finally, International patent application WO 01/19206 describes a particularly laborious method of preparing chewing gum, requiring a pretreatment of the basic gum mixture which is reduced to pellets of relatively small particles which in turn are then cooled to extremely low temperatures, i.e. below −40° C., by the addition of dry ice. Even when operation takes place in special, greatly dehumidified environments (with consequent greater economic expense and reduced practicality), this selection easily leads to the formation and accumulation of condensation on the dry ice intimately mixed with the gum composition, with the formation of lumps and agglutinations.

As mentioned above, however, the methods described in the above-mentioned patent documents have considerable drawbacks such as, for example, the production of chewing gum with poor chewability.

DESCRIPTION OF THE INVENTION

A method has now been discovered which permits the production of a chewing gum in powder form which is transformed, simply by compression, into a gum tablet with chewability and softness characteristics similar to or better than those of good-quality, conventionally-produced chewing gums, particularly with regard to optimal palatability throughout the chewing period.

A further advantage of the present invention is the ability to produce pharmaceutical or medicated chewing gums containing one or more active ingredients which are sensitive to heat; in fact, in contrast with conventional techniques, the mixing of the gum in powder form with the active ingredients and its subsequent transformation into the finished product does not require heating.

Another advantage offered by the process of the present invention is that it allows to produce a chewing gum in various forms and shapes other than the conventional ones, including tablets and micropellets of less than 0.8 grams (which would be very hard to produce with traditional means) simply by replacing the punches in a press.

A method for manufacturing miniature chewing gums is disclosed in WO 02/094032, filed by Wrigley, and it is substantially based in the extrusion of the chewing gum in the liquid filled chamber of a so-called "underwater pellettizer", as for instance that manufactured by Gala Industries and disclosed in WO 01/2137.

The method according to WO 02/094032 presents however a drawback which cannot be neglected: due to the technical characteristics of the underwater pellettizer, the amount of bulk sweetener in the chewing gum must be kept quite low; consequently, in case a sweet chewing gum is desired, the gum center extruded by the underwater pellettizer has to be surrounded by a coating which comprises at least 50% by weight of the coated chewing gum and which contains the necessary amount of bulk sweetener, as for instance disclosed in WO 02/094032, also filed by Wrigley.

On the contrary, the method according to the present invention permits to manufacture micropellet chewing gums independently of the amount of bulk sweetener requested.

Another advantage which will become clear from the following description is that the chewing-gum formulation in powder form can be packaged, dispatched, and preserved, even for prolonged periods of time, without losing its properties, in fact remaining completely in the granulated state.

Finally, another advantage offered by the present invention is that it is possible to produce a chewing gum in various forms other than the conventional forms and shapes, simply by replacing the punches in a tablet press.

In contrast with the prior art described in the literature, in order to prepare the powdered chewing-gum mixture, it is not necessary to use exclusively dry ingredients or to mix frozen ingredients in powder form without liquid ingredients or other forms of plasticization such as, for example, liquid flavourings, to avoid softening the mixture. In fact, one of the main characteristics of the present invention is the fact that it is possible to operate initially in accordance with the usual preparation method which is used for the preparation of conventional chewing gums (that is, those which are not in powder form).

Moreover, the method according to the present invention can be implemented without the aid of granulation coadjuvants such as, for example, alkali-metal phosphates, alkaline-earth metal phosphates, maltodextrins, or mixtures thereof, and/or without the aid of "bulking agents" such as, for example, gum arabic or pectin.

Another advantage of the following preparation method consists in the complete use and recovery of the product which thus permits an absence of processing losses or waste.

One of the elements which characterize the present invention is the use of "soft" basic gums which give rise to products having a pleasant chewing profile, comparable with, if not better than, that of conventional products. It has in fact been discovered that, in contrast with the prior art, it is possible to produce complete chewing-gum mixtures in powder form, ready to be compressed and thus also comprising the flavouring portion in the desired percentage, with the use of soft starting basic gums.

The method for the production of chewing gum in powder form according to the present invention is characterized in that it comprises the following steps:

a) mixing of a soft basic gum, i.e. a gum base, with at least one sweetener and, optionally, at least one other typical chewing-gum ingredient, at a temperature of between about 35 and 75° C., b) cooling of the mixture thus obtained to a temperature of between about 0 and −40° C. and, preferably, between −10 and −40° C., c) grinding and subsequent screening of the mixture thus obtained to a particle size of less than about 10 mesh, d) optional mixing of the powder thus obtained with at least one anti-agglutination agent, e) optional compression of the mixture thus obtained. The mixing (step a) is preferably performed at a temperature of between about 40 and 50° C. for a period of about 10-30 minutes, preferably 20 minutes.

The grinding (step c) is preferably performed until particles having a size of less than about 10 mesh and preferably less than 14 mesh are obtained.

Within the scope of the present invention, "soft basic gum" is intended to define a basic gum characterized by a penetration index, in 1/10 mm, which is greater than about 15 and, preferably, greater than 18 (measured in accordance with the "Standard method for Needle Penetration of Petroleum Waxes", ASTM D1321-97).

In particular, the soft basic gum preferably used for the implementation of the present invention will have the following qualitative/quantitative composition:

from about 8 to 16% of one of more elastomers, preferably selected from the group comprising polyisobutylene, isobutylene/isoprene copolymer, and vinyl acetate/vinyl laurate copolymer, from about 12 to 19% of polyvinyl acetate, from about 14 to 30% of resin preferably to be selected from the group comprising vegetable resin esters, resins produced by synthesis, and/or terpene resins, from about 10 to 22% of hydrogenated or partially hydrogenated vegetable oils, from about 0 to 7% of waxes selected from the group comprising vegetable waxes, waxes derived from petroleum, and/or synthetic waxes, from about 5 to 9% of emulsifiers and technological assistants, more precisely, but not exclusively, glycerol monostearate, acetylated monoglycerides, lecithin, sugar esters and triacetin, from about 15 to 40% of inert mineral fillers, up to about 0.1% of antioxidants.

The soft basic gum may be mixed in the usual manner with one or more polyols or with sugar, with or without the presence of polyol syrups or glucose syrup, with or without the presence of intensive sweeteners, and with or without the presence of liquid flavourings and other additives such as food acids, softeners, etc.

The selection of the specific ingredients does not alter the principle of the invention and is appropriate for the use of the product, particularly when the gum mixture in powder form is marketed as such and the purchaser intends to enrich it with further flavourings in powder form, intensive sweeteners, or dietary, functional, pharmaceutical, or cosmetic active ingredients, before forming tablets.

If the sweeteners and the other typical chewing-gum ingredients usable in step a) of the present invention are used in the solid state, they normally have a particle size of less than 200 μm and preferably less than 150 μm.

The term "typical chewing-gum ingredients" is intended to define intensive sweeteners, flavourings and other additives. In particular, intensive sweeteners typically used are aspartame, acesulfame and salts and derivatives thereof, saccharine, neohesperidin dihydrochalcone, sucralose, neotame, thaumatine, monelline etc. The term "flavourings" is intended to define any mixture of natural or synthetic aromatic oils or of individual active flavouring ingredients, taken individually or in combination, refreshing substances, etc., in solution or carried by a suitable vehicle by means of one or more of the known techniques.

The additives usable in the present invention are all of those commonly used in the production of conventional chewing gum and thus comprise colorants, food acids, softeners, flavourings, etc.

As is known in the art, the basic gum may be mixed with the use of preheated gum or gum at ambient temperature, according to its format, i.e., the use of 8-10 kg blocks of basic gum in fact requires preheating which is not necessary for formats which can be metered in pellets or drops. The basic gum is thus mixed with the ingredients selected as described above at a conventional temperature of between 35 and 75° C., most preferably between 40 and 55° C., for a period of time of between 10 and 30 minutes, with the use of one of the techniques known in the art. Upon completion of this mixing, the mixture is discharged and conditioned at a temperature of between −40 and 0° C. In particular, it is possible to operate discontinuously with prolonged cooling to temperatures between −30 and 0° C. and, preferably between −15 and −25° C.; alternatively, it is possible to use methods which ensure continuous cooling to temperatures of between −40 and −10° C.

The mixture is then ground by means of a blade mill. A percentage of the mass will be obtained with a satisfactory particle size straight away, whereas the portion with a particle-size greater than that desired is subsequently ground in a mill, optionally cooled to a temperature of between −40 and 0° C., and then recycled, thus achieving a 100% yield. Should it also be necessary to have a lower particle-size limit, the portion separated can be entirely reprocessed, thus also permitting complete recovery of the product in this case; the powder thus obtained preferably has a particle size greater than 100 mesh and, even more preferably, greater than 80 mesh.

Anti-agglutination agents such as, for example, metal salts of fatty acids, precipitated silica, sugar esters, polyols of the type most suitable for compression, for example, isomalt and xylitol, are added to the powder thus obtained.

Additionally one or more intensive sweeteners such as aspartame, acesulfame and salts and derivatives thereof, saccharine, neohesperidin dihydrochalcone, sucralose, neotame, thaumatine, monelline etc., aromatic active ingredients or flavourings in powder form or carried by encapsulation etc., food acids, or other additives with specific functional and pharmaceutical or nutritional active ingredients such as vitamins, amino-acids, polypeptides or other substances with functional or cosmetic activity may also be added at this stage.

The chewing-gum mixture in powder form thus obtained has the advantage that it can be used directly or can be packaged, stored and dispatched to a purchaser who can thus simply proceed with tablet-forming, possibly preceding this operation with an additional mixing with further flavourings in powder form, encapsulated flavourings etc., and/or dietary, functional, pharmaceutical or cosmetic active ingredients, as required. The pharmaceutical industry is in fact not normally equipped with the machinery used for processing chewing gums, and can give form and consistency to the finished product solely by compression of a powder. Up to now, these limitations have led to an underestimation of the potentialities of chewing gum as a release vehicle.

The final stage of the processing consists in forming into tablets or pills in a very wide selection of formats and dimensions by a tablet or a pill press or a tablet-forming machine; the tablets or pills thus obtained may therefore be packaged straight away in the desired format, i.e. in blister packs, sticks, etc. or sugar-coated, optionally also incorporating one or more flavourings, sweeteners and active ingredients in the coating, and then packaged.

A particular embodiment of the present invention is represented by chewing gums obtained by coating micropellets obtainable through the described process. Such coated micropellet chewing gums having a gum center surrounded by a coating and a total weight of less than 1.2 grams, preferably less than 0.8 grams, even more preferably less than 0.5 grams and/or a diameter lower than 10 mm, preferably lower than 8 mm. The coating will essentially consist of bulk sweeteners and it may comprise up to about 55%, preferably up to 45% by weight of the coated chewing gum; more than about 80% by weight of the preferred coating will normally consist of bulk sweeteners, more preferably from 85 to 95%.

The micropellets used as gum centers will normally contain from 40 to 90% by weight of basic gum and up to about 25% by weight of bulk sweeteners; preferably, from about 60 to 90% by weight of basic gum and from about 5 to 25% by weight of bulk sweeteners, even more preferably from 10 to 20% of bulk sweeteners, together with customary ingredients (such as intensive sweeteners, flavourings, anti agglutination agents and vegetable extracts). A preferred embodiment of the gum center which can be used for manufacturing the micropellet chewing gums according to the invention is disclosed in example 10 (and table 3).

Further aspects of the invention will become clear from the following experimental and comparative sections which should not, however, be considered as limiting of the invention.

EXPERIMENTAL SECTION

EXAMPLE 1

The following description refers to the preparation of a gum in powder form having the qualitative composition given in Example 1 in Table 1.

Initially, 29.3 parts by weight, which was the entire quantity of basic gum, was mixed, in a sigma mixer, heated to a temperature of between 40 and 50° C., with 13.47 parts of sorbitol in powder form, which was one third of the sorbitol quantity, and with 6.7 parts of mannitol. After a few minutes, a second portion of sorbitol in powder form, again of one third of the total was added, together with 0.4 parts of intensive sweeteners, mixing was continued for a few minutes, and the remaining sorbitol was then added, together with 2.2 parts selected from flavourings in liquid and powder form, homogenization of the mixture being continued for a further few minutes.

It is useful to point out that the quantity of flavouring which is in powder form could also be added after grinding.

10-30 minutes after the start of the mixing, the mixture thus obtained was discharged and left to condition at a temperature of about −20° C.

After a period of about 24 hours, the chewing-gum mixture thus treated was ground in a blade mill with a 4 mm² grating and the ground material was screened.

After screening, a mixture which had a particle size of less than 10 mesh and 60% of which had a particle size of less than 14 mesh was obtained.

3.5 parts of anti-agglutination mixture and 17.5 parts of isomalt of the type commonly marketed for applications in the tablet-forming field were added to 79 parts of the chewing-gum mixture in powder form thus obtained. The chewing-gum mixture in powder form was then compressed.

The method described above may also be applied to the preparation of gums in powder form having a composition other than that of Example 1, such as the compositions of Examples 2-8 of Tables 1 and 2.

EXAMPLE 6

The following description refers to the preparation of a gum in powder form having the qualitative composition given in Example 6 in Table 2. In the first step, 27 parts of soft basic gum, 36.8 parts of sorbitol, 5.3 parts of mannitol, 8.8 parts of isomalt, 2.3 parts of sorbitol syrup, 0.3 parts of intensive sweetener, 0.3 parts of liquid flavouring, and 0.2 parts of additive were mixed by methods similar to those described in the preceding example. In this example, the term "additives" means a plasticizer selected from those commonly used in chewing gum, in view of the low percentage of liquid flavouring used.

The mixture was discharged, conditioned, ground and, in the final step, 3 parts of anti-agglutination mixture and 16 parts of vegetable extracts were added to 81 parts of the mixture in powder form thus obtained. The chewing-gum mixture thus obtained could then be compressed.

EXAMPLE 8

The following description refers to the preparation of a gum in powder form having the qualitative composition given in Example 8 in Table 2. A method similar to that of the preceding example was used but, in this example, the quota of isomalt, which was equal to 21.5 parts, was composed of 6.5 parts of conventional isomalt for chewing gum, which was added in the first mixing step, and by 15 parts of isomalt of a type suitable for compression, which was added to the mixture in powder form, in the second step.

EXAMPLE 10

The following description refers to the preparation of a gum in powder form having a quantitative composition given in Example 10 in (Table 3). A method similar to that of previous examples was used. Chewing gums obtained under this example are particularly suited to be coated in order to obtain products with a weight lower than 1.2 grams, preferably lower than 0.8 grams, even more preferably less than 0.5 grams. It is worth of note that the softness characteristics of the basic gum are such that the chewing gum tablets thus obtain have pleasant chewing properties substantially identical to that of conventional chewing gums also when using high percentages of gum base.

The preferred coating for surrounding the compressed chewing gum obtained according to the present example will have the following by weight composition:

Intensive sweetener 1.4%
Flavour 3.5%
Colour (preferably TiO$_2$) 1.6%
Bulk sweetener (preferably maltitol) 87.5%
Other additives (preferably arabic gum) 6.0% Total 100.0%

TABLE 1

|  | Example No. 1 | Example No. 2 | Example No. 3 | Example No. 4 | Example No. 5 |
|---|---|---|---|---|---|
| Basic gum | 29.3 | 48.5 | 48.0 | 29.5 | 30.8 |
| Sorbitol | 40.4 | 47.5 | 46.5 | 39.7 | 50.3 |
| Mannitol | 6.7 |  |  | 6.9 | 4.4 |
| Isomalt | 17.5 |  |  | 17.0 | 7.0 |
| Citric acid |  |  |  | 0.6 |  |
| Additive |  |  |  | 0.5 | 0.6 |
| Intensive sweetener | 0.4 |  |  | 0.3 | 0.3 |

TABLE 1-continued

|  | Example No. 1 | Example No. 2 | Example No. 3 | Example No. 4 | Example No. 5 |
|---|---|---|---|---|---|
| Liquid flavouring | 0.6 |  |  | 1.0 | 1.6 |
| Flavouring in powder form | 1.6 |  |  | 2.0 |  |
| Plasticizer |  |  | 1.5 |  |  |
| Anti-agglutination mix | 3.5 | 4.0 | 4.0 | 2.5 | 5.0 |
| Total | 100.0 | 100.0 | 100.0 | 100.0 | 100.0 |

TABLE 2

|  | Example No. 6 | Example No. 7 | Example No. 8 |  | Example No. 9 |
|---|---|---|---|---|---|
| Basic gum | 27.0 | 32.1 | 25.3 | Basic gum | 20.2 |
| Sorbitol | 36.8 | 37.8 | 32.2 | Glucose syrup | 2.9 |
| Mannitol | 5.3 | 5.8 | 5.6 | Sucrose | 71.2 |
| Isomalt | 8.8 | 4.1 | 21.5 |  | — |
| Sorbitol syrup | 2.3 | 2.5 | 2.1 |  | — |
| Citric acid |  |  | 0.7 |  | — |
| Additives | 0.2 | 0.1 | 0.1 | Additives | 1.0 |
| Intensive sweetener | 0.3 | 0.3 | 0.3 |  |  |
| Liquid flavouring | 0.3 | 1.3 | 0.4 | Liquid flavouring | 0.7 |
| Flavouring in powder form |  | 2.0 | 0.7 | Flavouring in powder form | — |
| Anti-agglutination mix | 3.0 | 3.0 | 8.4 | Anti-agglutination mix | 4.0 |
| Vegetable extracts | 16.0 | 11.0 | 2.7 | Active ingredient | — |
| Total | 100.0 | 100.0 | 100.0 | Total | 100.0 |

TABLE 3

|  | Example No. 10 |
|---|---|
| Basic Gum | 70.0 |
| Sorbitol | — |
| Mannitol | — |
| Isomalt | 18.0 |
| Sorbitol syrup | — |
| Citric acid | — |
| Additives | — |
| Intensive sweetener | 0.2 |
| Liquid flavouring | 0.4 |
| Flavouring in powder form | 6.4 |
| Anti agglutination mix | 5.0 |
| Vegetable extracts | — |
| Total | 100.0 |

According to requirements, it is thus possible to add one or more intensive sweeteners such as aspartame, acesulfame and salts and derivatives thereof, saccharine, neohesperidin dihydrochalcone, sucralose, etc., aromatic active ingredients or flavourings in powder form or carried by encapsulation, etc., food acids, or other additives with specific functions, and pharmaceutical active ingredients or nutritional active ingredients such as vitamins, amino-acids, polypeptides, or other substances with functional or cosmetic activity.

Naturally, the addition of flavourings, encapsulated or otherwise carried, and the addition of heat-sensitive active ingredients takes place after the grinding in the stabilization step carried out with the use of one or more anti-agglutination agents known in the art and commonly used for this purpose, such as, for example, magnesium stearate, silica, talc, polyols of the type most suitable for compression, for example, isomalt, xylitol, etc.

After being formed into tablets or pills, the chewing gum thus obtained can thus also be sugar-coated as a normal chewing-gum or confectionery product, including intensive sweeteners, flavourings and active ingredients as described above in the coating.

COMPARATIVE SECTION

Despite constant attempts to apply instrument-based assessment methods to the study of chewing gum and the identification of its properties, the determining factor in the assessment of the chewing properties of a chewing gum is still subjective assessment by the chewer. The typical chewing sensation in fact includes the perception, prolonged over time, of odour, flavour, taste, colour, consistency, palatability and aftertaste.

Although qualitative and quantitative analytical methods exist for establishing the residual content of flavouring, active ingredients, and sweeteners or sugar in a chewing gum at a specific moment during chewing, there is not yet a method of assessing the perception of the pleasantness of the release of the flavouring and of the sweetness or the duration of both.

There are also objective parameters which may enable individual properties of the chewing gum to be assessed but, at the moment, there is no technique which is sufficiently sophisticated and complete to assess the combination of chewing properties defined as a whole in English as "mouth feel", which consists of a perception of various factors such as softness, resilience, slipperiness, and consistency of the bolus, which constitute the palatability of a chewing gum.

In order to assess the innovative aspects of the present invention, sensory assessment by a panel of chewers was therefore used and, in parallel, at least one significant parameter was assessed by performing a test measurement by means of a penetrometer.

The sensory assessment of the performance of a chewing gum and of the basic gum used to prepare it is generally based on three consecutive stages, referred to as (a) the first biting or chewing stage, (b) the intermediate biting or chewing stage, and (c) the final biting or chewing stage. To look at the assessment of a gum in greater detail, the first stage (a) or "first bite" corresponds to the first seconds of chewing in which the chewing gum is placed in the mouth and bitten into. At this stage, the chewing gum should respond to quite precise requirements such as the correct degree of compliance under the teeth, and should avoid breaking up into minute parts which might even involuntarily be ingested, which typically occurs with commercially-available compressed chewing gums. At the same time, however, in order for chewing to be pleasant from the very first moments, the chewing gum should not be particularly hard or stiff, which is another property that is lacking in currently available products of this type.

The second stage (b), known as the "intermediate" stage, is of longer duration and corresponds to the period of 30-60 seconds during which most of the sugar or sweeteners go into solution owing to the effect of the saliva and the product simultaneously releases most of the flavour. In this stage, it is particularly important for chewing to be uniform, in other words, for the physical drop in consistency due to the dissolving to be slight and not too noticeable, thus maintaining so-called "linear" behaviour.

The third or "final" stage (c) starts about one minute after the start of chewing and continues throughout the remaining time for which the gum is chewed. After most of the sugar or sweeteners have dissolved, a flavouring portion and a residue of sugars are still present and the gum is partially hydrated. During this stage, the characteristics of the basic gum are fundamental since it represents almost the whole of the residual bolus. With gums of a particular firmness which are used because they are more easily broken up, even if the intrinsic hardness is not perceived in the first two stages, possibly by virtue of some expedients, it will inevitably become apparent at this stage, rendering chewing difficult and unpleasant and, as such, not at all appealing.

Amongst the various parameters indicative of the performance of a chewing gum which can be measured objectively, that which relates to the chewing stage (a) or "first bite" is certainly indicative, though not exhaustively, of the quality of the product. The force necessary for a tooth initially to penetrate a sugar-coated pill or a tablet is in fact proportional to the hardness of the pill or tablet and can therefore give a measurement of how pleasant chewing may be. For tablets, hardness is proportional to friability and to the tendency to crumble during the first bites. The harder the product is, and hence the easier it is to grind and compress, the more marked will be its tendency to break up into minute bits which might even be ingested involuntarily. To demonstrate this, some measurements have been made on commercially-available products, experimental test pieces, and samples available commercially at trade fairs, with the use of a penetrometer (Sommer & Runge KG, Berlin) which is commonly used in the industry for assessing the hardness of plastic materials such as waxes which, as is well known, are also ingredients used in the preparation of the basic gum.

The measurements made, which were performed in parallel with sensory assessments, gave results indicative of the superior chewing characteristics of the samples produced in accordance with the present invention. Table 4 gives the results obtained for two commercial products, indicated as brand A and brand B, respectively, a product distributed at a trade fair, indicated as brand C, and two samples produced in accordance with the present invention.

TABLE 4

| | Sensory assessment upon: "first bite" | Penetration index (values in 1/10 mm) |
|---|---|---|
| Brand A* | Hard and friable in the mouth | 1-3 |
| Brand B* | Hard and friable in the mouth | 3-3.5 |
| Brand C* | Very hard and markedly friable in the mouth | 1.5-3 |
| Example 6 | Soft. Not friable | 6-7.5 |
| Example 8 | Quite soft. Not friable | 6-7.5 |

*The products indicated as BRAND A, B and C are compressed powder chewing gums corresponding respectively to:
BRAND A: Golnatur Propol-young, "Gum Tech" ®, lemon taste marketed by D. ULRICH SpA, Torino.
BRAND B: "Vitermine vitamine erbe e minerali Gola", mint taste, marketed by GUABER, Funo, Italia.
BRAND C: Compressed chewing gum tablets made with Satin ® I gum base manufactured by L.A. Dreyfus Company.

As can be seen, the experimental measurement confirms the judgement with regard to the sensory assessment of the specific parameter.

The performance claimed in the present invention is achieved with the use of "soft" gums which give rise to products with a pleasant chewing profile which is comparable with, if not better than, that of conventional products.

It is important to stress that the values given above are significant only to the above examples and variations in the composition of the basic gum may lead to appreciably different results. Although basic gums having formulations other than that given above are used conventionally for the preparation of high-quality chewing-gum products by conventional methods in conventional formats, i.e., sticks, or dragées, they do not have the characteristics of softness possessed by basic gums with the formulation given above.

In particular, it can easily be shown that high-quality basic gums in which only two of the categories of ingredients indicated above differ from those of the gums of the present invention have clearly different characteristics in terms of softness. Two basic gums, identified as gum 1 and gum 2, given by way of example in Table 5, have the following differences in comparison with the formulation described above.

TABLE 5

|  | gum 1 | gum 2 | gum 3 |
|---|---|---|---|
| waxes selected from the group comprising vegetable waxes and waxes derived from petroleum or produced by synthesis | 30-32% | 30-32% | 0-7% |
| inert mineral filler products | 10-12% | 10-12% | 15-40% |

To confirm what has been stated and the difference described, a test measurement by penetrometer was also used in this case to assess the consistency and hardness of the basic gum samples, by comparing the two samples described above with a third identified as: gum 3 which had a formulation corresponding to that described above. The results are given in Table 6.

TABLE 6

|  | gum 1 | gum 2 | gum 3 |
|---|---|---|---|
| Penetration in 1/10 mm (values of three readings) | 8/9.5/9.5 | 10.5/9.5/9.5 | 21/21.5/22 |
| Penetration in 1/10 mm (calculated average of three readings) | 9 | 9.8 | 21.5 |

A further parameter commonly used by the industry to characterize a basic gum is the softening point. This measurement, which is performed by the so-called "ring & ball" technique, provides for the measurement of the initial softening temperature of the basic gum and the temperature at which it actually passes through, with the use of a standard body, once the softening point is reached. Two temperatures and the respective interval are thus obtained and provide extremely useful information on the characteristics of the gum. In the specific case of the gums given by way of example, the temperatures measured are given in Table 7.

TABLE 7

|  | gum 1 | gum 2 | gum 3 |
|---|---|---|---|
| Initial softening temperature (° C.) | 77 | 78 | 47 |
| Softening Point (° C.) | 79 | 79 | 56 |
| Softening interval (° C.) | 2 | 1 | 9 |

It is clear from the data set out above that the difference between the examples, gum 1 and gum 2, on the one hand and gum 3, on the other, is not only in the macroscopic difference in the absolute values of the softening temperatures which would themselves be a significant indicator; in fact, the extent of the softening interval is also in direct correlation with the characteristics of greater plasticity and softness in gum 3 in comparison with the greater stiffness of gum 1 and gum 2.

It is thus clear that the use of a soft basic gum is a particularly important parameter for the production of chewing gums in powder form which have palatability characteristics comparable with, if not better than, those of conventional chewing gums.

The invention claimed is:

1. A method of producing a chewing gum powder for use in making compressed chewing gum products comprising:
   a) mixing a soft gum base, having a penetration index greater than about 15 ddm as measured in accordance with ASTM D1321-97 with at least one sweetener at a temperature between about 35° C. and about 75° C.;
   b) cooling the mixture thus obtained to a temperature of between about 0 and about −40° C.; and
   c) grinding the mixture thus obtained to obtain a powder having a particle size less than about 10 mesh,
      wherein said resultant powder remains a free flowing powder at room temperature and may be mixed with additional ingredients and compressed to form compressed chewing gums having a chewability and softness characteristics comparable to or better than extruded chewing gums.

2. The method of claim 1, wherein the mixture is cooled to a temperature between about −10° C. and about −40° C.

3. The method of claim 1, wherein the powder is ground to a particle size of less than 14 mesh.

4. The method of claim 1, wherein the penetration index of the soft basic gum is greater than about 18 ddm.

5. A method of producing a compressed chewing gum comprising the method of claim 1.

6. The method of claim 1, wherein the sweetener is in the solid state and has a particle size of less than about 200 μm.

7. The method of claim 1, wherein the sweetener is selected from the group consisting of sucrose, glucose, polyols, sorbitol, mannitol, lactitol, isomalt, xylitol, and syrups thereof.

8. The method of claim 1 further comprising addition of a typical chewing-gum ingredient selected from the group consisting of intensive sweeteners, flavourings, additives, colourings, and mixtures thereof.

9. The method of claim 8, wherein the intensive sweetener is selected from the group consisting of aspartame, acesulfame, salts or derivatives of acesulfame, saccharine, neohesperidin dihydrochalcone, sucralose, neotame, thaumatine, monelline, and mixtures thereof.

10. The method according to claim 1, further comprising addition of an antiagglutination agent selected from the group consisting of maguesium stearate, silica, talc, sugar esters and polyols, to the chewing gum powder after grinding.

11. Method according to claim 1, wherein the antiagglutination agent is isomalt.

12. The method according to claim 1 which is performed in the absence of granulation coadjuvants or bulking agents.

13. The method of claim 1 further comprising mixing with the chewing gum powder at least one pharmaceutical active ingredient and compressing the mixture into a finished chewing gum product.

14. The method of claim 1 further comprising mixing with the chewing gum powder at least one additional flavoring and compressing the mixture into a finished chewing gum product.

15. The method of claim 1 further comprising mixing with the chewing gum powder at least one dietary, functional or cosmetic active and compressing the mixture into a finished chewing gum product.

16. A method of producing a chewing gum powder for use in making compressed chewing gum products comprising:
   a) mixing a soft gum base having a penetration index greater than about 15 ddm as measured in accordance with ASTM D1321-97 and comprising from about 8 to about 16% of at least one elastomer, from about 12 to about 19% of polyvinyl acetate, from about 14 to about 30% of resin, from about 10 to about 22% of at least one hydrogenated or partially hydrogenated vegetable oil, from about 0 to about 7% of wax, from about 5 to about 9% of at least one emulsifier, from about 15 to about 40% of inert mineral fillers, and up to about 0.1% of antioxidant with a least one sweetener at a temperature between about 35° C. and about 75° C.;
   b) cooling the mixture thus obtained to a temperature of between about 0 and about −40° C.; and
   c) grinding the mixture thus obtained to obtain a powder having a particle size less than about 10 mesh,
   wherein said resultant powder remains a free flowing powder at room temperature and may be mixed with additional ingredients and compressed to form compressed chewing gum having a chewability and softness characteristics comparable to or better than extruded chewing gums.

17. The method of claim 16, wherein the soft gum base has the following composition by weight: from about 8 to about 16% of at least one elastomer, from about 12 to about 19% of polyvinyl acetate, from about 14 to about 30% of resin, from about 10 to about 22% of at least one hydrogenated or partially hydrogenated vegetable oil, from about 0 to about 7% of wax, from about 5 to about 9% of at least one emulsifier, from about 15 to about 40% of inert mineral fillers, and up to about 0.1% of antioxidant, in which the sum of the various components amounts to 100.

18. The method of claim 16, wherein the elastomer is selected from the group consisting of polyisobutylene, isobutylene/isoprene copolymer, and vinyl acetate/vinyl laurate copolymer.

19. The method of claim 16, wherein the resin is selected from the group consisting of vegetable resin esters, resins produced by synthesis, and terpene resins.

20. The method of claim 16, wherein the wax is selected from the group consisting of vegetable waxes, waxes derived from petroleum, and synthetic waxes.

21. The method of claim 16, wherein the emulsifier is selected from the group consisting of glycerol monstearate, sugar esters, and lecithin, and the technological assistant is selected from the group consisting of acetylated monoglycerides and triacetin.

22. The method of claim 16, wherein the sweetener is in the solid state and has a particle size of less than about 200 µm.

23. The method of claim 16, wherein the sweetener is selected from the group consisting of sucrose, glucose, polyols, sorbitol, mannitol, lactitol, isomalt, xylitol, and syrups thereof.

24. The method of claim 16, further comprising addition of a typical chewing-gum ingredient selected from the group consisting of intensive sweeteners, flavourings, additives, colourings, and mixtures thereof.

25. The method of claim 24, wherein the intensive sweetener is selected from the group consisting of aspartame, acesulfame, salts or derivatives of acesulfame, saccharine, neohesperidin dihydrochalcone, sucralose, neotame, thaumatine, monelline, and mixtures thereof.

26. The method according to claim 16, further comprising addition of an antiagglutination agent selected from the group consisting of magnesium stearate, silica, talc, sugar esters and polyols, to the chewing gum powder after grinding.

27. Method according to claim 26, wherein the antiagglutination agent is isomalt.

28. The method according to claim 16 which is performed in the absence of granulation coadjuvants or bulking agents.

29. The method of claim 16 further comprising mixing with the chewing gum powder at least one pharmaceutical active ingredient and compressing the mixture into a finished chewing gum product.

30. The method of claim 16 further comprising mixing with the chewing gum powder at least one additional flavoring and compressing the mixture into a finished chewing gum product.

31. The method of claim 16 further comprising mixing with the chewing gum powder at least one dietary, functional or cosmetic active and compressing the mixture into a finished chewing gum product.

32. Method of producing a compressed chewing gum comprising:
   a) mixing a soft gum base having a penetration index greater than about 15 ddm as measured in accordance with ASTM D1321-97 with at least one sweetener at a temperature of between about 35 and about 75° C.;
   b) cooling the mixture thus obtained to a temperature of between about 0 and about −40° C.;
   c) grinding the mixture thus obtained to give a powder having a particle size less than about 10 mesh; and
   d) compressing said powder to form a chewing gum;
   wherein the powder of step c remains a free flowing powder at room temperature and may be mixed with additional ingredients prior to compression and upon compression forms a chewing gum having a chewability and softness characteristics comparable to or better than extruded chewing gums.

33. Method according to claim 32, further comprising mixing with the powder obtained in step (c) at least one cosmetic active ingredient, prior to compression.

34. Method according to claim 32, further comprising mixing with the powder obtained in step (c) at least one nutritional active ingredient, prior to compression.

35. Method according to claim 32, further comprising mixing with the powder obtained in step (c) at least one pharmaceutical active ingredient, prior to compression.

36. The method of claim 32 further comprising addition of a typical chewing-gum ingredient selected from the group consisting of intensive sweeteners, flavourings, additives, colourings, and mixtures thereof.

37. The method according to claim 32, further comprising addition of an antiagglutination agent selected from the group consisting of magnesium stearate, silica, talc, sugar esters and polyols, to the chewing gum powder after grinding.

38. Method according to claim 32, wherein the antiagglutination agent is isomalt.

39. The method according to claim 32 which is performed in the absence of granulation coadjuvants or bulking agents.

40. The method of claim 32 further comprising mixing with the chewing gum powder at least one pharmaceutical active ingredient and compressing the mixture into a finished chewing gum product.

41. The method of claim 32 further comprising mixing with the chewing gum powder at least one additional flavoring and compressing the mixture into a finished chewing gum product.

42. The method of claim 32 further comprising mixing with the chewing gum powder at least one dietary, functional or cosmetic active and compressing the mixture into a finished chewing gum product.

43. Method of producing a compressed chewing gum comprising:
   a) mixing a soft gum base having a penetration index greater than about 15 ddm as measured in accordance with ASTM D1321-97 with at least one sweetener at a temperature of between about 35 and about 75° C.;
   b) cooling the mixture thus obtained to a temperature of between about 0 and about −40° C.;
   c) grinding the mixture by means of a grinding apparatus;
   d) subsequently screening the mixture; and
   d) compressing the powder to form a chewing gum.

44. The method of claim 43 wherein the grinding apparatus is a mill.

45. The method of claim 43 wherein the grinding apparatus is a blade mill.

46. Method of producing a chewing gum powder for use in making compressed chewing gum products comprising:
   a) mixing a soft gum base having a penetration index greater than about 15 ddm as measured in accordance with ASTM D1321-97 with at least one sweetener at a temperature of between about 35 and about 75° C.;
   b) cooling the mixture thus obtained to a temperature of between about 0 and about −40° C.;
   c) grinding the mixture by means of a grinding apparatus;
   d) subsequently screening the mixture
      wherein said resultant powder remains a free flowing powder at room temperature and may be mixed with additional ingredients and compressed to form compressed chewing gums having a chewability and softness characteristics comparable to or better than extruded chewing gums.

47. The method of claim 46, wherein the mixture is cooled to a temperature between about −10° C. and about −40° C.

48. The method of claim 46, wherein the powder is ground to a particle size of less than 10 mesh.

49. The method of claim 46 wherein the penetration index of the soft basic gum is greater than about 18 ddm.

50. The method of claim 46, wherein the soft gum base comprises by weight from about 8 to about 16% of at least one elastomer, from about 12 to about 19% of polyvinyl acetate, from about 14 to about 30% of resin, from about 10 to about 22% of at least one hydrogenated or partially hydrogenated vegetable oil, from about 0 to about 7% of wax, from about 5 to about 9% of at least one emulsifier, from about 15 to about 40% of inert mineral fillers, and up to about 0.1% of antioxidant.

51. A method of producing a compressed chewing gum comprising the method of claim 46.

* * * * *